Sept. 11, 1962   J. W. ALLEN   3,053,365
COUPLING DEVICE
Filed Nov. 17, 1959

INVENTOR.
JOSEPH W. ALLEN
BY
ATTORNEY

United States Patent Office 3,053,365
Patented Sept. 11, 1962

3,053,365
COUPLING DEVICE
Joseph W. Allen, Essex Fells, N.J., assignor to The Bendix Corporation, a corporation of Delaware
Filed Nov. 17, 1959, Ser. No. 853,495
2 Claims. (Cl. 192—84)

The present invention relates to coupling means and more particularly to coupling means for a dynamoelectric machine.

In aircraft it has been the normal practice to connect generators to a drive pad on the engines in such a manner that the generator can not be disconnected from the drive without the removal of the generator. This can only be accomplished when the aircraft is on the ground. Under certain conditions, due to the malfunction of the generator, it is desirable to be able to disconnect the generator from the drive while the aircraft is in flight. Otherwise there is a possibility that severe damage may be done to the aircraft engine and may even endanger the flight of the aircraft.

The present invention provides novel means for disconnecting a generator while the aircraft is in flight. This is accomplished by shifting the flux path of a permanent magnet normally utilized to hold mating jaws in mesh.

It is an object of the invention to provide novel disconnect means.

Another object of the invention is to provide novel means for disconnecting apparatus from a driving source.

Another object of the invention is to provide novel means for disconnecting an aircraft generator from the driving source.

Another object of the invention is to provide means for quickly disconnecting a generator from a driving source.

Another object of the invention is to provide improved means for disconnecting a driven member from a drive member.

The above and other objects and features of the invention will appear more fully hereinafter from a consideration of the following description taken in connection with the accompanying drawing, wherein one embodiment of the invention is illustrated by way of example.

Figure 1:
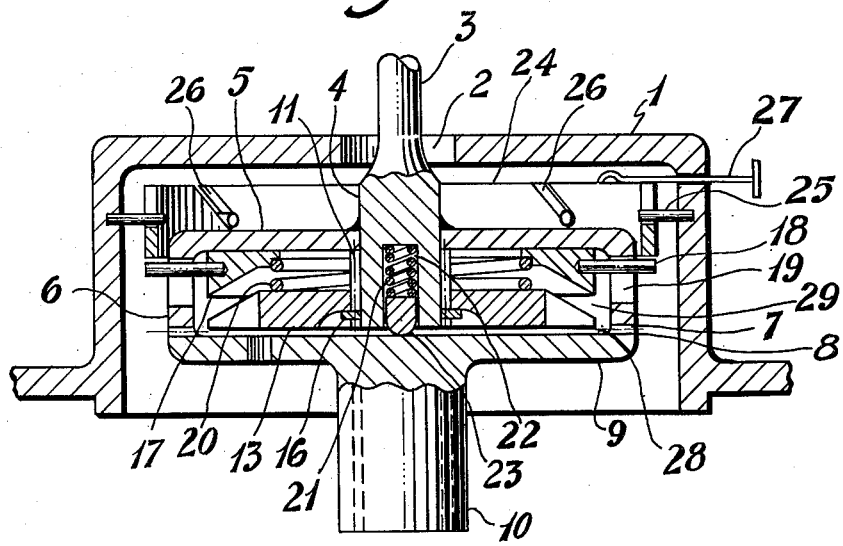
FIGURE 1 is a sectional view of a device embodying the invention.
Figure 2:
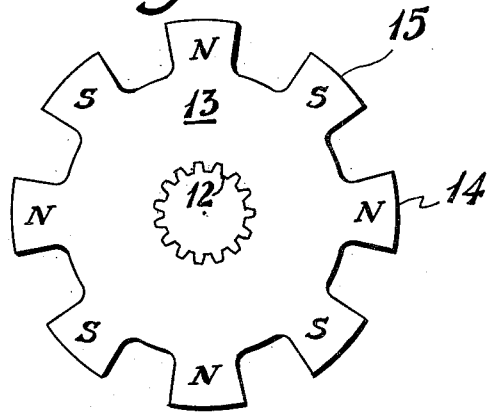
FIGURE 2 is a top view of the permanent magnet of FIGURE 1.

Referring now to the drawing, a portion of a housing 1 is shown which may be the housing for a generator, the details of which have been omitted. Extending through an opening 2 in the housing 1 is a shaft 3 upon which the generator rotor is mounted. It is understood that the shaft 3 may be mounted by bearings in the housing 1.

The shaft 3 has an enlarged section 4 which has a jaw member 5 secured thereto. The jaw member 5 has an axially extending flange 6 terminating in a toothed section 7 adapted to mate with a toothed section 8 of driving jaw 9. The jaw 9 has a shank 10 adapted to slidably engage a driving member (not shown) which may be a power takeoff of an aircraft engine. The section 4 also has a splined portion 11 adapted to mate with splines 12 of a permanent magnet 13. The magnet 13 has a plurality of north and south pole projections 14 and 15. A snap ring 16 retains the magnet 13 on the shaft 3. While the magnet 13 is illustrated as splined to the shaft 3, it is not necessary that it be splined thereto. The magnetic pull would be sufficient to hold it in position.

Positioned in the jaw member 5 is a soft iron ring 17 having pins 18 extending through slots 19 in the flange 6 of the jaw 5. A spring 20 is positioned between the magnet 13 and iron ring 17 and tends to keep them apart. A spring 21 is positioned in a counterbore 22 in the shaft 3 and coacts with a plunger 23 to yieldably bias the member 9 away from the jaw 5.

A circumferentially movable ring 24 is positioned in the housing 1 by pins 25 engaging cam slots 26 in the ring 24. A pull rod 27 is provided for rotating the ring 24. It is understood, however, that other means could be employed to rotate the ring 24.

In operation, in the engaged position as shown in the drawing, air gap 28 between the magnet 13 and jaw 9 is substantially less than air gap 29 between the magnet 13 and the ring 17. Thus the pull by the magnet 13 is sufficient to overcome the force of the spring 21 and hold the jaw 9 into engagement with the jaw 5. The spring 20 biases the ring 17 away from the magnet 13.

If it is desired to disconnect the generator, the ring 24 is rotated by the pull rod 27 in a direction so that the pins 25 in camways 26 will cause the ring to move axially and coact with pins 18 to move the ring 17 into contact with the magnet 13. This reduces the air gap 29 to a minimum and provides a flux path between the polar projections 14 and 15 of the magnet 13 in parallel with the flux path between the projections 14 and 15 and the jaw 9. Under the aforenoted condition, the pull of the magnet 13 and the jaw 9 is less than the force of the spring 21 which will then move and hold the jaw 9 out of engagement with the jaw 5. Movement of the jaw 9 further lessens the pull of the magnet 13 thereon. In as much as the plunger 23 will be the bearing surface for rotation when the jaws are disengaged, it is preferable that it have a shape and be of a material suitable for a bearing.

In a specific example, using Alnico V for the magnet 13, with the pieces engaged the air gap 28 between the jaw 9 and magnet 13 was .02 inch and the gap 29 between the magnet 13 and ring 17 was .25 inch. Under the above conditions, the flux density through gap 28 would be 11.5 kg. at 260 oersteds and that of gap 29 would be 1.0 kg. at 260 oersteds. This resulted in a pull between the magnet 13 and jaw 9 of 5 pounds per projection and between the magnet 13 and ring 17 of 0.04 pound per projection. Thus the spring 20 is only strong enough to overcome the pull of 0.04 pound per projection to keep the magnet 13 and ring 17 separated. The resultant pull on the jaw 9 by the magnet 13 is sufficient to hold the teeth of the jaw 9 into engagement with the teeth of the jaw 5 and rotate the same.

If it is desired to disconnect the driving engagement of the generator, the ring 24 is rotated by the pull rod 27 which causes the ring 17 to move into contact with the magnet 13. The gap 29 is reduced to a minimum value and the flux therein is 12.5 kg. at 40 oersteds. This reduces the flux through the gap 28 to 1.95 kg. at 40 oersteds. This reduces the pull between the jaw 9 and magnet 13 to .15 pound per projection. In order to separate the jaws 9 and 5, the spring 21 needs only slightly more than .15 pound per projection to overcome the pull between the jaw 9 and magnet 13 to actuate the plunger 23 to force the jaws 9 and 5 out of engagement. As the jaw 9 is moved out of engagement and away from the magnet 13, the pull there between becomes less thereby permitting the jaws 5 and 9 to be held out of engagement by the spring 21.

In order to reset the magnet 13 and ring 17, a plurality of holes may be provided in the jaw 9 so that a push rod and hook may be inserted to pull on the magnet 13 and push the ring 17 to return them to their normal positions thus restoring the pull by the magnet 13 to the jaw 9. With jaws 5 and 9 seated by overcoming the pressure of spring 21, the air gap 28 is reduced thereby decreasing the pull between the magnet 13 and ring 17. Pushing the ring 17 increases the gap 29, thus permitting the spring 20 to maintain the ring 17 away from the magnet 13.

In the holding, disconnecting and reconnecting phases, the demagnetizing forces on the permanent magnet never exceed that encountered when the assembly is in its normal coupled operating condition. The magnet 13 can be magnetized out of the assembly, and a temporary keeper applied to the face towards the jaw 9. With the ring 17 pushed into contact with the magnet 13, the keeper can be removed. This permits the use and handling of the magnet to be at maximum flux conditions at all times.

Although only one embodiment of the invention has been illustrated and described, various changes in the form and relative arrangement of the parts, which will now appear to those skilled in the art, may be made without departing from the scope of the invention.

What is claimed is:

1. A coupling device for a dynamoelectric machine comprising a shaft member, a jaw member secured to said shaft for rotation therewith, said jaw member having an axially extending flange terminating in a toothed section, a second jaw member having an axially extending flange terminating in a toothed section and adapted to mate with said first jaw member, a permanent magnet positioned on said shaft member between said jaw members and adjacent said second jaw member, a soft iron ring positioned between said magnet and said first jaw member, spring means positioned between said magnet and said soft iron ring to yieldably hold said soft iron ring away from said magnet, means for moving said soft iron ring axially into contact with said magnet, and spring means for urging said jaw members apart.

2. A device for connecting a driven shaft to a driving shaft, comprising a driving jaw member connected for rotation to said driving shaft and movable axially therewith, said driving jaw member having teeth extending axially away from said driving shaft, a driven jaw member connected to said driven shaft for rotation therewith, said driven jaw member having axially extending teeth adapted to mate with the teeth of said driving jaw member, a permanent magnet positioned on said driven shaft adjacent to said driving jaw member and forming a flux path therebetween, a soft iron ring positioned adjacent said driven jaw member and forming a second flux path between said ring and said magnet, spring means yieldably biasing said ring away from said magnet to normally provide an air gap greater than the air gap between said magnet and said driving jaw member, means for moving said ring against the force of said spring means into contact with said permanent magnet to provide an air gap less than the air gap between said magnet and said driving jaw member and spring means for moving said jaw members out of engagement.

References Cited in the file of this patent

UNITED STATES PATENTS

| | | |
|---|---|---|
| 2,437,871 | Wood | Mar. 16, 1948 |
| 2,886,150 | Seavey | May 12, 1959 |
| 2,919,775 | Wiedmann et al. | Jan. 5, 1960 |
| 2,954,859 | Rabinow | Oct. 4, 1960 |
| 2,962,142 | Straub | Nov. 29, 1960 |
| 2,962,144 | Heinemann | Nov. 29, 1960 |

FOREIGN PATENTS

| | | |
|---|---|---|
| D. 21,278 | Germany | Sept. 13, 1955 |